United States Patent [19]

Spence

[11] 4,327,454
[45] May 4, 1982

[54] WATER-POWERED BRUSH WITH GEAR DRIVE

[75] Inventor: Bertle Spence, Moscow, Id.

[73] Assignee: Water Front Products, Inc., Spokane, Wash.

[21] Appl. No.: 122,032

[22] Filed: Feb. 19, 1980

[51] Int. Cl.³ .................. A46B 13/06; B08B 1/04; B60S 3/06
[52] U.S. Cl. ............................................. 15/29
[58] Field of Search ...................................... 15/29

[56] References Cited

U.S. PATENT DOCUMENTS

| 661,277 | 11/1900 | Rix ...................................... | 15/29 |
| 3,114,164 | 12/1963 | Riordan ............................... | 15/29 |

FOREIGN PATENT DOCUMENTS

| 1253079 | 12/1960 | France ................................. | 15/29 |
| 2295800 | 7/1975 | France ................................. | 15/29 |
| 569396 | 11/1957 | Italy ..................................... | 15/29 |
| 1156344 | 6/1969 | United Kingdom ................. | 15/29 |

Primary Examiner—Chris K. Moore
Attorney, Agent, or Firm—Wells, St. John & Roberts

[57] ABSTRACT

A water-powered brush having a rotatable wheel powered by a water jet connected to an external source of water under pressure. The wheel rotates the outer end of a shaft positively connected to a ring gear about a brush that is rotatably mounted to the enclosure of the apparatus about an axis parallel to the wheel axis. Exhausted water from the enclosure is delivered through the center of the rotating brush.

4 Claims, 6 Drawing Figures

WATER-POWERED BRUSH WITH GEAR DRIVE

BACKGROUND OF THE INVENTION

This invention relates to a water-powered brush. Water is used for rotating the brush through a water-driven wheel coupled to the brush by a positive gear train. Exhausted water is also supplied to the brush for rinsing purposes.

The instant apparatus was developed specifically for rotating circular brushes used for scrubbing and cleaning surfaces, such as on automobiles, or along the hulls of boats. It is designed to be used in a submerged condition for cleaning of boat hull surfaces below the water line. By relying totally upon water for power, it is an ecologically acceptable driving unit in lakes, streams or other bodies of water subject to environmental restrictions that might be violated when using other hydraulic systems.

The apparatus basically comprises a rotatable wheel that is driven by a jet of water under pressure. The wheel is externally coupled to a circular brush through a meshing drive gear train. The internal water-powered wheel is spun at a high rotational velocity, and is maintained clear of water by surrounding wall surfaces and an arcuate guard. A deflector within the wheel enclosure diverts the spent water to an exit opening in hydraulic communication with an aperture at the center of the rotating brush.

DESCRIPTION OF THE PREFERRED EMBODIMENT

Figure 1:
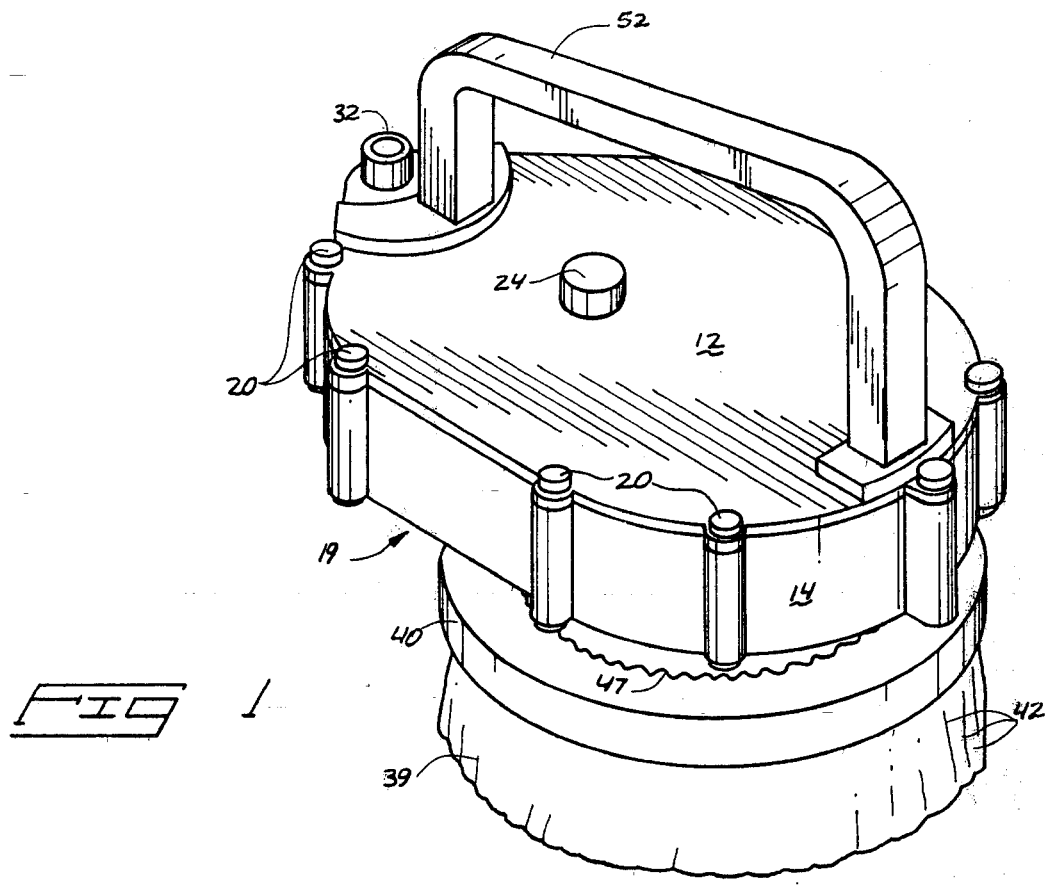
FIG. 1 is a perspective view of the completed assembly.
Figure 2:
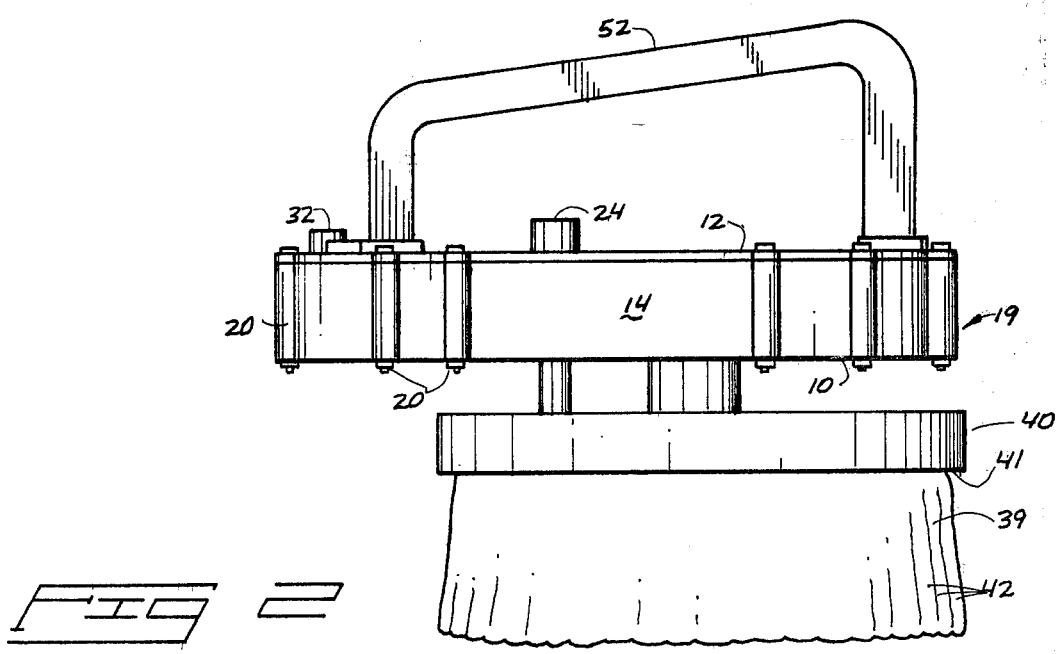
FIG. 2 is a side elevation.
Figure 3:
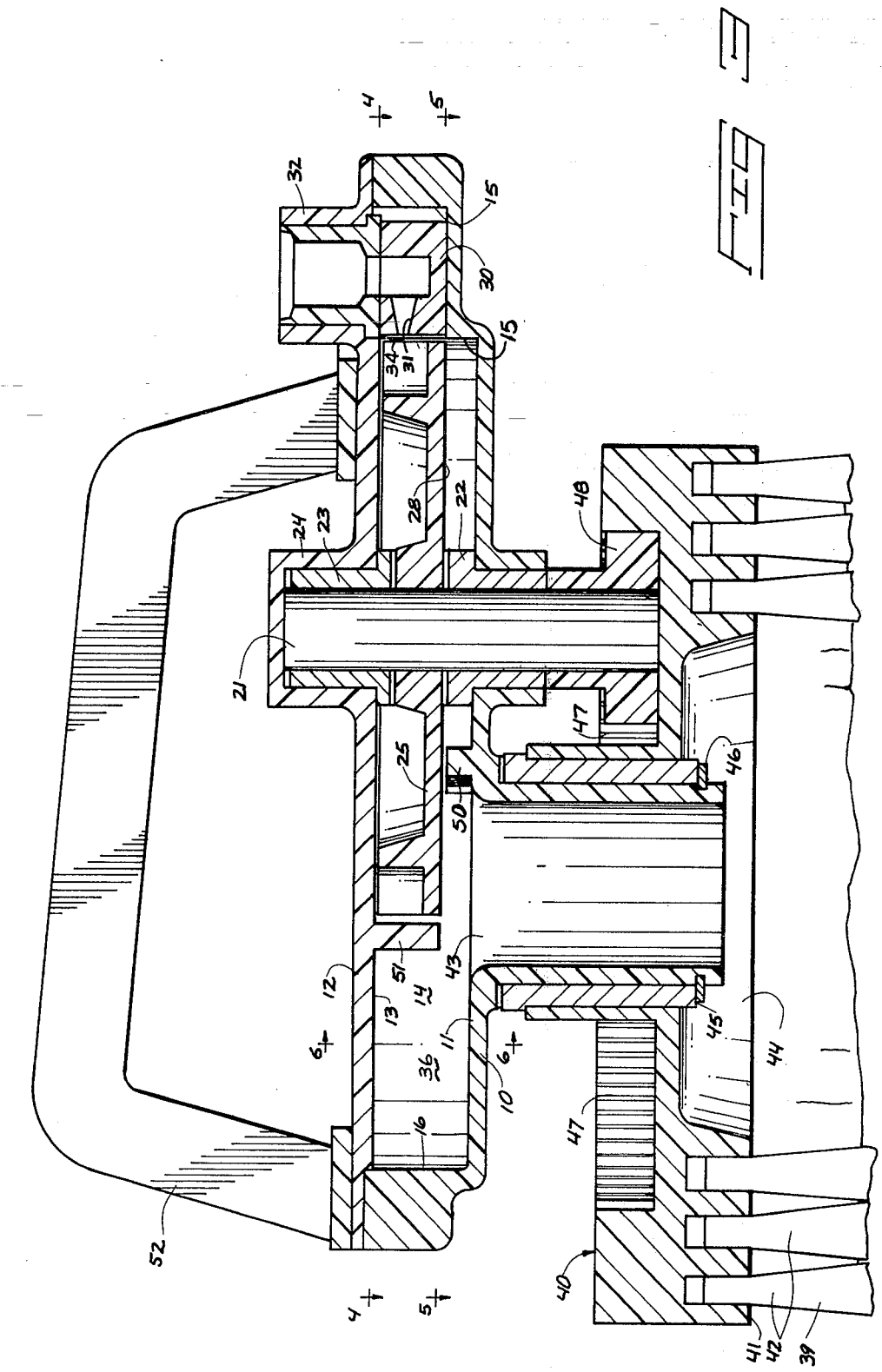
FIG. 3 is an longitudinal section taken along line 3—3 in FIG. 4.

As shown in FIG. 1, the basic assembly comprises a sealed enclosure 19 which houses a water-driven wheel mechanically coupled to a circular brush 39 rotatably journalled at the exterior of enclosure 19. The basic drive train is shown in FIG. 3. The rotatable wheel 25 is coupled to a spur gear 48 that is meshed with a ring gear 47 about the body 40 of the circular brush 39. This provides substantial speed reduction from the high velocity wheel 25 to the circular brush 39.

Figure 4:
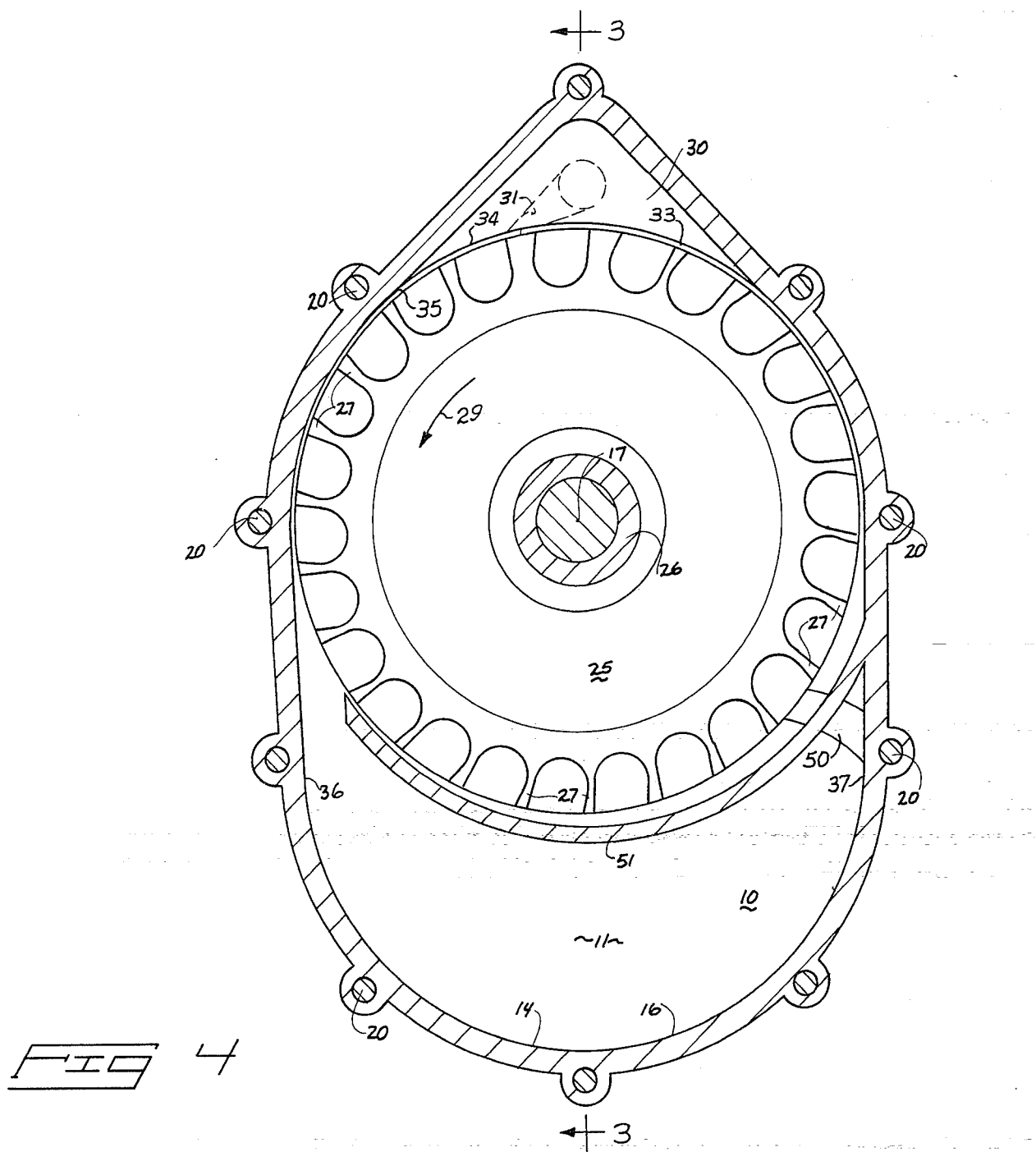
FIG. 4 is a section taken along line 4—4 in FIG. 3.
Figure 5:
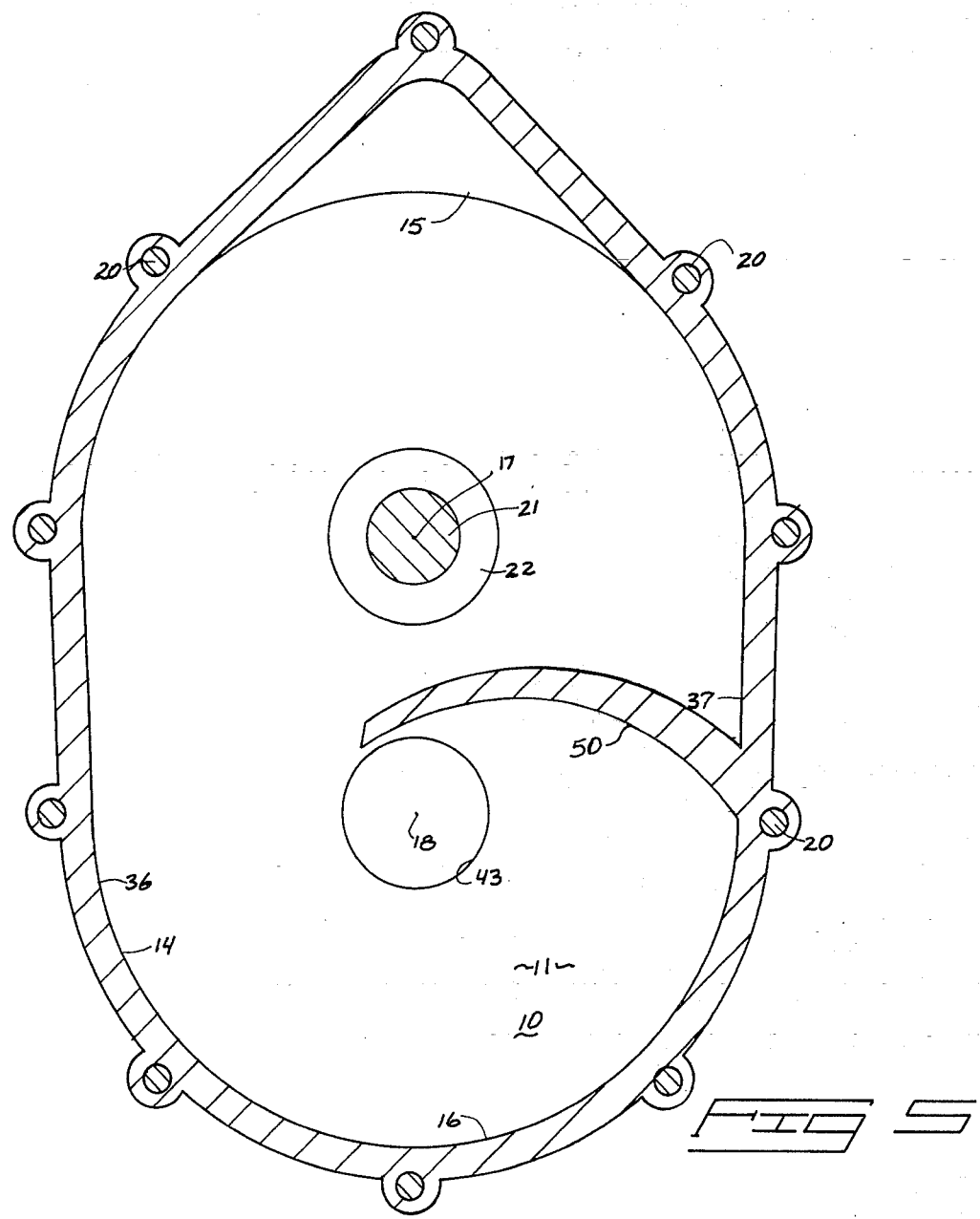
FIG. 5 is a section taken along line 5—5 in FIG. 3.
Figure 6:
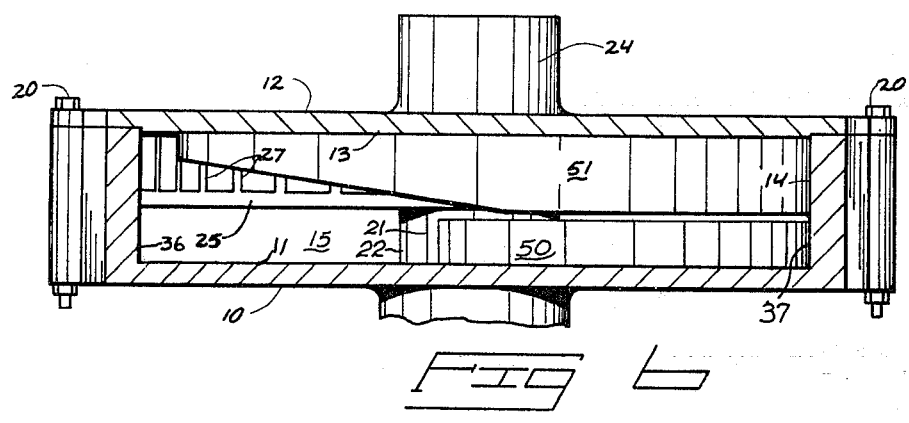
FIG. 6 is a fragmentary sectional view taken along line 6—6 in FIG. 3.

Referring specifically to FIGS. 3 through 6, the detailed structure of the enclosure 19 and the drive mechanism for rotating wheel 25 can be described. Enclosure 19 is sealed, and has first and second walls 10, 12 with parallel inner surfaces 11, 13 respectively. The surfaces 11, 13 overlay one another and are bounded by a side wall structure 14 that connects the first wall 10 and second wall 12 in the completed assembly. The side wall structure 14 has a continuous oval-shaped inner configuration including a first semicircular end surface 15 and a second similar surface 16. The two semicircular end surfaces 15, 16 each have a substantially equal radius generated about a first axis 17 and a second axis 18, respectively (FIGS. 4 and 5). The axes 17, 18 are perpendicular to the inner surfaces 11, 13 and are spaced apart by a distance less than the radius of each end surface 15 or 16.

In the specific illustrated example, the first wall 10 and side wall structure 14 are formed integrally as one half of the enclosure 19. It is completed by the separable second wall 12. When assembled, the second wall 12 is held in place across the outer edges of the side wall structure 14 by a plurality of peripheral bolts 20.

The first and second walls 10, 12 support a perpendicular shaft 21 which includes a center shaft axis designated in FIG. 3 as the first axis 17. Shaft 21 is journalled by bearings 22 located within the first wall 10 and by coaxial bearings 23 recessed within the second wall 12. Bearings 22, 23 journal the shaft 21 for rotational movement about the first axis 17 relative to the stationary enclosure 19. Shaft 21 has an outer end 24 that is projected axially beyond the first wall 10 of the enclosure 19. The bearings 22, 23 are constructed of materials capable of providing rotational support in a water environment. They support shaft 21 for rotation at relatively high speeds.

Wheel 25 is shown in detail in FIGS. 3 and 4. It includes a center hub 26 which is centered along axis 17 and is fixed to shaft 21 for conjoint rotation with it. Wheel 25 has a radially bladed circular periphery in the form of blades 27 which define a series of open pockets located adjacent to the second wall 12. The outer surface 28 of wheel 25, which faces toward the first wall 10 of enclosure 19, is smooth and planar. This minimizes frictional drag on wheel 25 due to water contact in the spaced area between wheel 25 and the first wall 10 of enclosure 19.

The outside radius of wheel 25 is substantially equal to the radius of the side wall end surface 15 described above. The axial thickness of wheel 25 is less than the spacing between the inner surfaces 11, 13 of the first and second spaced walls 10, 12. These size and spatial relationships are evident in the drawings.

Wheel 25 is fixed to shaft 21 at an axial position adjacent the second wall 12 of enclosure 19. Wall 12 and wheel 25 together present a continuous series of pockets about the periphery of wheel 25 within which pressurized water can react for imparting rotation to it.

Water is supplied to the wheel 25 through an inlet jet casing 30 fixed to the removable second wall 12. Casing 30 is located within a complementary recess in the side wall 14 at the first end surface 15. The inner edges of the inlet jet casing 30 in the completed assembly provide a smooth continuation of the semicircular end surface 15 at which power is transmitted to the wheel 25 by an external supply of pressurized water (not shown).

The inlet jet casing 30 includes an exit nozzle 31 which is directed angularly toward one side of the periphery of wheel 25 in the intended direction of wheel rotation (shown by arrow 29 in FIG. 4). The nozzle 31 is replaceable and forms a sealed connection to a water supply fitting 32 provided at the exterior of the second wall 12.

To provide maximum transmission of power to wheel 25, it is important that there be careful control of the clearance between the periphery of wheel 25 and the adjacent semicircular end surface areas at both sides of nozzle 31. The arcuate walls 33 at the entrance side of nozzle 31 should be formed with a very close tolerance to provide adequate back pressure for proper water direction. The arcuate wall 34 at the exit side of nozzle 31 has slightly more clearance, but is still closely fitted to assure efficient water containment against the blades 27 of the wheel 25. This close tolerance is maintained at the exit side of nozzle 31 to point 35, which is the point of initial release of water from within the pockets about the periphery of wheel 25. From point 35 on, in the direction of rotation of wheel 25, there is greater separation between wheel 25 and the inner surfaces of side wall 14. This separation becomes a complete opening as the periphery of wheel 25 moves inwardly within enclosure 19 and separates from the relatively straight section of the oval enclosure interior.

As an example, wall 33 has been constructed with a wheel clearance of 0.015 inches and wall 34 with a clearance of 0.040 inches for use adjacent to a wheel 25 having an outer periphery of 2.250 inches.

Referring to FIGS. 4 and 5, the straight connecting sections of the side wall structure 14 that join the two semicircular end surfaces 15, 16 are shown as a downstream wall 36 and an upstream wall 37, the terms "downstream" and "upstream" being related to the direction of movement of wheel 25 relative to enclosure 19.

To control the flow of water after it leaves wheel 25 due to centrifugal forces adjacent to the downstream wall 36, there are provided a deflector 50 affixed to the first wall 10 and overlapped by wheel 25, and a peripheral guard 51 which is fixed to the inner surfaces 13 of the second wall 12.

The deflector 50 extends from the upstream wall 37 as a substantial continuation of the second semicircular end surface 16. It wraps inwardly from wall 37 to the far side of an opening 43 formed through the first wall 10. Water from the wheel 25 is therefore channeled to the opening 43, which is centered about the second axis 18 described above.

Guard 51 is spaced slightly from the downstream wall 36 of enclosure 19 and extends to the upstream wall 37. Its thickness progressively increases to substantially equal that of the mounted wheel 25. Its purpose is to substantially prevent reentrance of water into the pockets formed about wheel 25 by the radial blades 27. This reduces frictional drag and load on the revolving wheel 25, which is maintained in a substantially empty condition due to centrifugal forces. The tapered nature of guard 51 permits all of the water from within the wheel pockets to be emptied and reduces the sharp shearing forces that would be exerted by a perpendicular surface across the end of guard 51. The radius of the guard surface adjacent or facing wheel 25 is substantially identical to the radius of the first semicircular end surface 15.

The circular brush 39 includes a rigid body 40 that is rotatably mounted to enclosure 19 about the second axis 18. The brush body 40 includes a central axial aperture 41 surrounded by a plurality of axially projecting bristles 42. The brush body 40 is rotatably journalled about the opening 43, which includes an axially projecting tubular exit 44. A bearing 45 is interposed between the exterior of the tubular exit 44 and the brush body 40 to facilitate brush rotation. The brush 39 is releasably held in place on the tubular exit 44 by a releasable retainer clip 46.

Rotational movement is transmitted from wheel 25 to brush 39 by means of a spur gear 48 fixed to the outer end 24 of shaft 21. The spur gear 47 is in meshing driving engagement with a ring gear 47 formed about the inner configuration of the brush body 40. The spur gear-ring gear arrangement provides substantial speed reduction between the rotation imparted to wheel 25 and the rotation of circular brush 39.

Enclosure 19 may be provided with a handle 52, as illustrated on the second wall 12, or can be attached to any other type of suitable mounting apparatus for manual use or for incorporation within other equipment within which the brush 39 is used. It is also to be understood that this apparatus might be used for revolving a cylindrical brush mounted along axis 18 in place of the circular brush as shown.

The rotation of wheel 25 is controlled by controlling the flow of water to the inlet jet casing 30. When pressurized water is supplied through nozzle 31, the reaction forces against the blades 27 will cause the wheel 25 to be spun about its axis 17. The resulting centrifugal forces will maintain wheel 25 clear of water as the wheel periphery recedes from the downstream wall section shown at 36. However, the moving water will continue moving along the semicircular end surfaces 16 within enclosure 19 and will be channeled about the enclosure interior until it is directed inwardly by deflector 50. Deflector 50 directs the spent water to the relatively large opening 43 in hydraulic communication with the tubular exit 44 and the aperture 41 within the circular brush 39.

The rotation of wheel 25 is mechanically coupled to brush 39 through the gears 47, 48 to provide direct drive to the rotatable brush 39. At the same time, the exiting water is directed to the center of brush 39 for rinsing or washing purposes.

Various modifications might be made in the specific design of some of the components illustrated in the drawings. It is to be understood that such changes are intended within the scope of this disclosure and the appended claims.

Having described my invention, I claim:

1. In a water-powered brush assembly:
a sealed enclosure having first and second parallel walls spaced from one another;
a shaft having a center shaft axis;
coaxial bearing means on said first and second walls journalling said shaft for rotational movement about the shaft axis relative to the enclosure;
said shaft having one end protruding axially outward beyond the first wall of said enclosure;
a bladed wheel having a center wheel axis;
said wheel being located within said enclosure and being fixed coaxially to said shaft for conjoint rotation with the shaft;
water inlet means in said enclosure for directing water under pressure to the bladed wheel for rotating the wheel relative to the enclosure about its axis;
a brush rotatably mounted to the exterior of the first wall of said enclosure about a brush axis parallel to and spaced from the shaft axis, said brush having an aperture formed therethrough centered along the brush axis;
meshing gear means on said brush and the outer end of said shaft for transmitting rotational movement between them;
the interior of the sealed enclosure being defined by a continuous side wall extending between said first and second walls, said side wall having opposed inner end surfaces;
the axial thickness of the bladed wheel being less than the separation between the first and second walls within the enclosure;

the periphery of the bladed wheel being located within the enclosure in close proximity to one inner end surface of said side wall and is spaced radially inward from the remaining inner end surface;

water outlet means in the form of an opening through the first wall of the enclosure coaxial with said brush axis for directing water from within the enclosure through the brush aperture;

deflector means for directing water from said remaining inner end surface to said opening;

and guard means overlapping an adjacent portion of the wheel periphery facing the remaining inner end surface of the enclosure for preventing water from reentering the bladed wheel periphery from said remaining inner end surface.

2. A brush assembly as set out in claim 1 wherein said water inlet means comprises a jet fixed within the enclosure adjacent to the wheel, said jet having an outlet nozzle directed angularly toward one side of the periphery of the bladed wheel in its intended direction of rotation about the wheel axis.

3. A brush assembly as set out in claim 1 wherein the continuous side wall extends between said first and second walls in an oval configuration, said side walls having inner semicircular end surfaces of a radius substantially equal to the wheel radius and centered, respectively, about the wheel axis and the brush axis.

4. In a water-powered brush assembly:

a sealed enclosure having first and second spaced walls having parallel inner surfaces overlying one another and bounded by a side wall structure connecting said walls and having a continuous oval-shaped inner configuration including first and second semicircular end surfaces of equal radius generated about first and second axes perpendicular to the inner surfaces of the first and second walls and spaced apart by a distance less than the radius of the end surfaces;

a shaft having a center shaft axis;

bearing means on said first and second spaced walls journalling said shaft coaxially with said first axis for rotational movement of the shaft about the shaft axis relative to the enclosure;

said shaft having an outer end projected axially beyond the first wall of the enclosure;

a wheel having a center wheel axis, the wheel having a radially bladed circular periphery with an outside radius substantially equal to the radius of the side wall end surfaces in said enclosure, and having an axial thickness less than the spacing between the inner surfaces of the first and second spaced walls within the enclosure;

said wheel being located within the enclosure and being coaxially fixed to said shaft at an axial position adjacent said second wall of the enclosure for conjoint rotation with the shaft;

an inlet jet formed through the first semi-circular end surface of the enclosure and including a nozzle directed angularly toward one side of the wheel periphery in its intended direction of rotation;

a brush mounted to the exterior of said first wall of the enclosure for rotation relative to the enclosure about said second axis, said brush having an aperture formed therethrough centered along the second axis;

meshing gear means on said brush and the outer end of said shaft for transmitting rotational movement between them;

water outlet means in the form of an opening through the first wall of the enclosure coaxial with said second axis for directing water from within the enclosure through the brush aperture;

deflector means fixed to the inner surface of said first wall of the enclosure for directing water from the second semicircular end surface thereof to said opening;

and guard means fixed to the inner surface of said second wall overlapping an adjacent portion of the wheel periphery facing the second semicircular end surface of the enclosure for preventing water from reentering the bladed wheel periphery from the second semicircular end surface.

* * * * *